July 20, 1954 G. MOUNTJOY 2,684,402
DUAL-PURPOSE CARRIER-WAVE RECEIVER
Filed Dec. 31, 1949
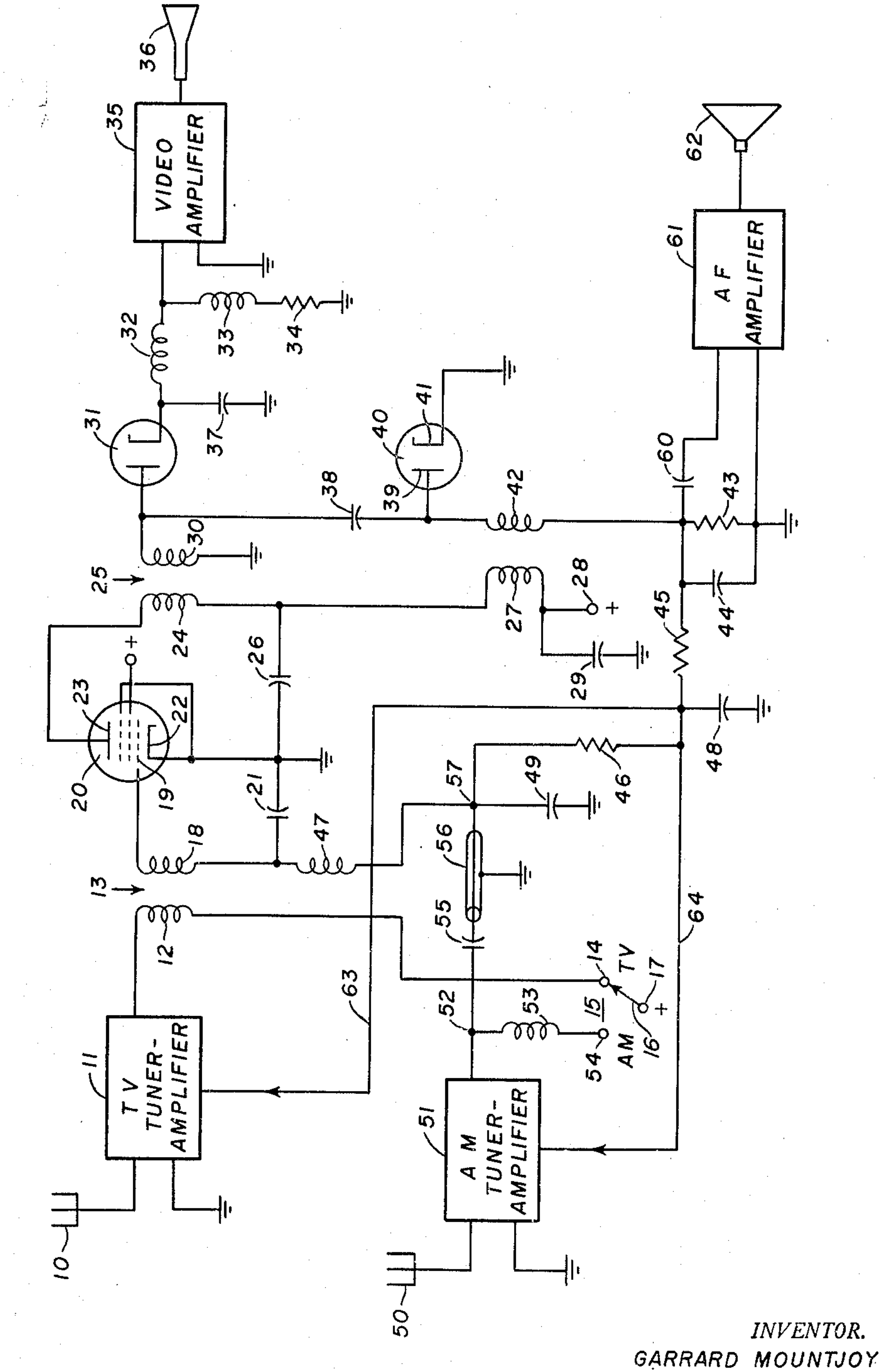
INVENTOR.
GARRARD MOUNTJOY
BY Albert R. Hodges
ATTORNEY Patented July 20, 1954 2,684,402

UNITED STATES PATENT OFFICE 2,684,402

DUAL-PURPOSE CARRIER-WAVE RECEIVER

Garrard Mountjoy, Canandaigua, N. Y., assignor to Stromberg-Carlson Company, a corporation of New York Application December 31, 1949, Serial No. 136,310

8 Claims. (Cl. 178—5.8)

The present invention relates to dual-purpose carrier-wave receivers and more particularly to a receiver capable of selectively receiving television broadcasts and amplitude-modulation broadcasts.

Receivers capable of selectively receiving television broadcasts and amplitude-modulation broadcasts known heretofore have generally employed separate detectors for agc purposes. Such arrangements are wasteful of parts.

It is therefore an object of my invention to provide a receiver capable of selectively receiving television broadcasts and ampltiude-modulation broadcasts, but which is simple and uses a minimum of parts.

Another object of the invention is to provide a dual-purpose carrier-wave receiver in which a single rectifier is utilized to perform a plurality of functions, thereby minimizing the number of different components required.

A further object of my invention is to provide a dual-purpose carrier-wave receiver in which the second detector for amplitude-modulation broadcast reception functions also to provide agc voltage to the intermediathe frequency amplifier, not only during amplitude-modulation broadcast reception but also during television reception.

In accordance with the present invention, there is provided a receiver adapted for the selective reception of first and second types of signals. This receiver includes a first signal path comprising a first tuner and a first detector, and a second signal path comprising a second tuner and a second detector. Also provided are an amplifier common to the first and second signal paths and adapted for automatic gain control, means associated with the second detector for developing direct-current voltages corresponding respectively with the first and second types of signals, means for utilizing these voltages respectively to automatically control the gain of the amplifier during the reception of the first and second types of signals, and means for utilizing the rectified signal outputs of the first and second detectors corresponding respectively to the first and second types of signals.

In accordance with another feature of the present invention, either or both of the first and second signal paths of the receiver may include an amplifier adapted for automatic gain control, and the direct-current voltages developed by the second detector corresponding respectively with the first and second types of signals may be utilized to automatically control the gain of these amplifiers during the reception of the first and second types of signals.

Still another feature of the present invention is to provide a dual-purpose carrier-wave receiver adapted for the reception of first and second types of signals, in which the tuner for receiving one of these types of signals may be remotely located with respect to the remainder of the equipment, without appreciable detrimental effect.

The above and other objects and features of the present invention will be better understood by referring to the following description taken in connection with the accompanying drawing, in which the single figure is a schematic diagram, partly in block form, of a dual-purpose carrier-wave receiver in accordance with the present invention.

Referring now to the drawing, there is shown a superheterodyne television receiver modified in accordance with the present invention to permit the selective reception of amplitude-modulation signals. Those portions of the receiver which are utilized during the reception of television broadcasts will first be described. The television signals are intercepted by an antenna 10 which supplies a television tuner-amplifier unit 11 which may comprise, for example, a radio-frequency amplifier, a modulator or mixer, and a local oscillator, these components being preferably ganged for simultaneous tuning to the desired television signal.

The output of television tuner unit 11 is supplied to one terminal of the primary winding 12 of a television intermediate-frequency coupling transformer 13. The other terminal of primary winding 12 is connected to a contact 14 of a single-pole double-throw switch 15, the movable arm 16 of which is connected to a suitable source of positive potential 17, it being assumed that the output from television tuner-amplifier unit 11 is conductively connected to the anode of an electron discharge device (not shown) comprising a portion of the mixer of unit 11.

The secondary winding 18 of transformer 13 has one of its terminals connected to the control electrode 19 of an electron discharge device 20 which is preferably a high-frequency pentode amplifier of the type having a remote cutoff. The lower terminal of secondary winding 18 is bypassed to ground by capacitor 21, and cathode 22 of device 20 is directly grounded as shown.

The anode 23 of device 20 is connected to one terminal of the primary winding 24 of a television intermediate-frequency transformer 25, the other terminal of secondary winding 24 being bypassed to ground by a capacitor 26 and being connected, through an inductance coil 27, to a source of suitable positive potential 28, which in turn is by-passed by a capacitor 29. One terminal of secondary winding 30 of transformer 25 is grounded as shown. The other terminal of winding 30 supplies a video detector 31, which may be an electron discharge tube of the diode type as shown. The rectified output of this detector is developed across a load comprising choke coils 32 and 33 and resistor 34. The portion developed across choke coil 33 and resistor 34 in series is supplied to a video amplifier 35, which in turn supplies a cathode-ray tube 36. A conventional by-pass capacitor 37 is connected between the output of rectifier 31 and ground.

The ungrounded terminal of secondary winding 30 of transformer 25 is also coupled, by means of a capacitor 38, to the anode 39 of an electron discharge device 40 of the diode type, cathode 41 of which is grounded as shown. A network comprising an inductance coil 42 and a resistor 43 in series is connected between anode 39 of electron discharge device 40 and ground. Resistor 43 is by-passed by a capacitor 44. The ungrounded terminal of resistor 43 is connected, by means of resistors 45 and 46 and inductance coil 47, to the junction of secondary winding 18 of transformer 13 and capacitor 21. The junction of resistors 45 and 46 is by-passed to ground by a capacitor 48, and the junction of resistor 46 and coil 47 is by-passed to ground by a capacitor 49.

With switch 15 in the position shown in the drawing, the receiver functions in the conventional manner as a receiver of television broadcasts. The television intermediate-frequency carrier developed at the output of television tuner-amplifier unit 11 is amplified by electron discharge device 20 and is rectified by video detector 31, to produce picture signals which are suitably amplified by video amplifier 35 and reproduced in cathode-ray tube 36. The amplification of electron discharge device 20 is automatically regulated inversely in accordance with the strength of the received signal by the action of electron discharge device 40 operating as an automatic gain control rectifier to develop across resistor 43 a direct-current voltage which is proportional to the strength of the received signal. This direct-current voltage is applied, by means of resistors 45 and 46 and inductance coil 47, to control electrode 19 of electron discharge device 20, so that the amplification of this device is automatically decreased as the received signal strength increases, and vice versa. The time constants of resistor-capacitor combinations 45, 48 and 46, 49 are so chosen that the presence of the modulation due to the picture signal has no appreciable effect upon the operation of the automatic gain control. The sound signals accompanying the video signals may be separated out and reproduced in any suitable manner (not shown).

The portion of the dual-purpose receiver which is utilized during the reception of amplitude-modulation signals will now be described. Such signals are intercepted by an antenna 50 and supplied to an amplitude-modulation tuner-amplifier unit 51, which preferably includes a radio-frequency amplifier, a mixer, and a local oscillator. Output terminal 52 of unit 51 is connected to one terminal of an inductance coil 53, the other terminal of which is connected to contact 54 of switch 15. If it is assumed that movable arm 16 of this switch is thrown to its left-hand position, it will be apparent that the lower terminal of inductance coil 53 is then connected to positive potential source 17. Output terminal 52 is coupled, by means of a capacitor 55 and, if desired, by a length of coaxial line 56, to the junction 57 of inductance coil 47 and capacitor 49.

In accordance with the invention, inductance coil 53 and capacitor 55 are so chosen as to resonate at the amplitude-modulation intermediate frequency of the receiver, as for example at 455 kilocycles. Similarly, inductance coil 47 and capacitor 21 are so chosen that they resonate at the amplitude-modulation intermediate frequency. Capacitor 49 is chosen to give the proper degree of low-end coupling between resonant circuits 53, 55 and 47, 21 to provide a desired relatively narrow bandpass characteristic. In this manner, the output of amplitude-modulation tuner-amplifier unit 51 is effectively applied to control electrode 19 of electron discharge device 20, and this device thus operates as an amplitude-modulation intermediate-frequency amplifier. Capacitor 26 and inductance coil 27 are so chosen that they resonate at the amplitude-modulation intermediate frequency, as are capacitor 38 and inductance coil 42. Inductance coils 27 and 42 are coupled to provide a desired bandpass characteristic, so that the amplified amplitude-modulation intermediate-frequency carrier is applied to electron discharge device 40, which in this instance operates as the amplitude-modulation demodulator, the resultant audio-frequency signal being developed across resistor 43 and being supplied, by means of a capacitor 60, to an audio-frequency amplifier 61 and a loud speaker 62. It will be apparent, therefore, that the desired degree of selectivity for satisfactory amplitude-modulation signal reception is achieved with the minimum of additional components, and without deleterious effect upon the performance of the receiver for television signal reception. Discharge device 40 also operates simultaneously to develop a direct-current voltage across resistor 43 which is utilized, as above explained, to automatically control the amplification of discharge device 20 inversely in accordance with the strength of the received signal.

In both modes of operation described above, it has been assumed that only electron discharge device 20 has its amplification automatically controlled inversely in accordance with the strength of the received signal. If desired, television tuner-amplifier unit 11 and amplitude-modulation tuner unit 51 may each include one or more electron discharge devices, the gain of which may also automatically be controlled inversely in accordance with the strength of the received signal. Connections for providing this additional automatic control are indicated respectively by leads 63 and 64.

It will be noted that the high-frequency impedance between junction 57 and ground is relatively low. For this reason, a substantial length of coaxial line 56 may be employed, if desired, thereby permitting amplitude-modulation tuner-amplifier unit 51 and the components directly associated therewith to be located at a point relatively remote from the remainder of the equipment. This is one of the important features of the present invention. It will also be noted that electron discharge device 40 is utilized as a video automatic gain control rectifier, as an amplitude-modulation demodulator, and as an amplitude-modulation automatic gain control rectifier. Thus to triply utilize a single component of the equipment is another important feature of the present invention.

While there has been described what is at present considered the preferred embodiment of the invention, it will be ovious to those skilled in the art that various changes and modifications may be made therein without departing from the invention, and it is, therefore, aimed in the appended claims to cover all such changes and modifications as fall within the true spirit and scope of the invention.

What is claimed is:

1. In a receiver, a first signal path adapted for the selective reception of a first type of signals and comprising a first tuner and a first detector comprising a single electron discharge device, a second signal path adapted for the selective reception of a second type of signals and comprising a second tuner and a second detector comprising a single electron discharge device, an amplifier common to said first and second signal paths and adapted for automatic gain control, said second detector being counnected to develop direct-current voltages corresponding respectively with said first and second types of signals, means for utilizing said voltages respectively to automatically control the gain of said amplifier during the reception of said first and second types of signals, and means for utilizing the rectified signal outputs of said first and second detectors corresponding respectively to said first and second types of signals.

2. In a receiver, a first signal path adapted for the selective reception of a first type of signals and comprising a first tuner and a first detector comprising a single electron discharge device, a second signal path adapted for the selective reception of a second type of signals and comprising a second tuner having an amplifier unit adapted for automatic gain control and a second detector comprising a single electron discharge device, an amplifier common to said first and second signal paths and adapted for automatic gain control, said second detector being connected to develop direct-current voltages corresponding respectively with said first and second types of signals, means for utilizing said voltages respectively to automatically control the gain of said amplifiers during the reception of said first and second types of signals, and means for utilizing the rectified signal outputs of said first and second detectors corresponding respectively to said first and second types of signals.

3. In a receiver, a first signal path adapted for the selective reception of a first type of signals and comprising a first tuner having an amplifier adapted for automatic gain control and a first detector comprising a single electron discharge device, a second signal path adapted for the selective reception of a second type of signals and comprising a second tuner having an amplifier adapted for automatic gain control and a second detector comprising a single electron discharge device, an amplifier common to said first and second signal paths and adapted for automatic gain control, said second detector being connected to develop direct-current voltages corresponding respectively with said first and second types of signals, means for utilizing said voltages respectively to automatically control the gain of said amplifiers during the reception of said first and second types of signals, and means for utilizing the rectified signal outputs of said first and second detectors corresponding respectively to said first and second types of signals.

4. In a receiver, a first signal path adapted for the selective reception of a first type of signals and comprising a first tuner and a first detector comprising a single electron discharge device; a second signal path adapted for the selective reception of a second type of signals and comprising a second tuner and a second detector comprising a single electron discharge device, said second tuner having a relatively low-impedance output circuit and being remotely located relative to said first tuner; an amplifier common to said first and second signal paths and adapted for automatic gain control; said second detector being connected to develop direct-current voltages corresponding respectively with said first and second types of signals; means for utilizing said voltages respectively to automatically control the gain of said amplifier during the reception of said first and second types of signals; and means for utilizing the rectified signal outputs of said first and second detectors corresponding respectively to said first and second types of signals.

5. In a receiver, a first signal path adapted for the selective reception of a first type of signals and comprising a first tuner and a first detector comprising a single electron discharge device; a second signal path adapted for the selective reception of a second type of signals and comprising a second tuner remotely located relative to said first tuner and a second detector comprising a single electron discharge device; an amplifier common to said first and second signal paths and adapted for automatic gain control, said amplifier being coupled to said second tuner by a coaxial line; said second detector being connected to develop direct-current voltages corresponding respectively with said first and second types of signals; means for utilizing said voltages respectively to automatically control the gain of said amplifier during the reception of said first and second types of signals; and means for utilizing the rectified signal outputs of said first and second detectors corresponding respectively to said first and second types of signals.

6. In a receiver adapted for the selective reception of amplitude modulated audio broadcast and television signals; a television tuner; an intermediate frequency amplifier connected to said tuner, said amplifier comprising an electron discharge device having at least an anode, a cathode, and a control electrode and an output transformer having primary and secondary windings; an input circuit connected between said control electrode and said cathode; an output circuit connected between said anode and said cathode; said input circuit including a first capacitor having one of its terminals connected to said cathode; said output circuit including said primary winding, a first inductance, and a source of positive potential connected in series; a second capacitor connected between said cathode and the connection between said primary winding and said first inductance; means connected to said amplifier output circuit for detecting and reproducing said television signals; an amplitude modulation broadcast tuner; said amplitude modulation broadcast tuner having an output circuit comprising a second inductance and a source of positive potential; a gain control circuit responsive to the output of said amplifier connected between said amplifier output circuit and said amplifier input circuit and including a fourth capacitor, third and fourth inductances connected in series, and a diode; said first and third inductances being coupled magnetically to provide the desired band pass characteristics and also to apply the amplified amplitude modulation broadcast signal intermediate frequency to said diode whereby said diode simultaneously develops gain control voltage and audio frequency signals; means for connecting said amplitude modulation output circuit to said amplifier input circuit including a third capacitor; said first inductance and said second capacitor resonating at a desired amplitude modulation frequency, said second inductance and said third capacitor resonating at said frequency, and said fourth inductance and said first capacitor resonating at said frequency.

7. In a receiver adapted for the selective reception of amplitude modulated audio broadcast and television signals; a television tuner; an intermediate frequency amplifier connected to said tuner, said amplifier comprising an electron discharge device having at least an anode, a cathode, and a control electrode and an output transformer having primary and secondary windings; an input circuit connected between said control electrode and said cathode; an output circuit connected between said anode and said cathode; said input circuit including a first capacitor having one of its terminals connected to said cathode; said output circuit including said primary winding, a first inductance, and a source of positive potential connected in series; a second capacitor connected between said cathode and the connection between said primary winding and said first inductance; means connected to said amplifier output circuit for detecting and reproducing said television signals; an amplitude modulation broadcast tuner; said amplitude modulation broadcast tuner having an output circuit comprising a second inductance and a source of positive potential; a gain control circuit responsive to the output of said amplifier connected between said amplifier output circuit and said amplifier input circuit and including a fourth capacitor, third and fourth inductances connected in series, and a diode; said first and third inductances being coupled magnetically to provide the desired band pass characteristics and also to apply the amplified broadcast signal amplitude modulation intermediate frequency to said diode whereby said diode simultaneously develops gain control voltage and audio frequency signals; means for connecting said amplitude modulation output circuit to said amplifier input circuit including a third capacitor, said first inductance and said second capacitor constituting a first resonant circuit, said second inductance and said third capacitor constituting a second resonant circuit, and said fourth inductance and said first capacitor constituting a third resonant circuit, said resonant circuits being chosen to resonate at said amplitude modulation broadcast signal intermediate frequency; and a fifth capacitor connected to said gain control circuit, said fifth capacitor being chosen to provide the degree of coupling necessary between said second and third resonant circuits to effect a desired relatively narrow bandpass characteristic.

8. In a receiver adapted to selective reception of standard television and amplitude modulation audio broadcast signals, the combination of a television tuner including frequency conversion means, an intermediate frequency amplifier, a television second detector connected to the output of said intermediate frequency amplifier, television picture reproducing means connected to said television second detector, means resonantly connected to the output of said intermediate frequency amplifier for detecting amplitude modulation to yield audio signals and for producing an automatic gain control voltage effective to control the gain of said intermediate frequency amplifier in accordance with the strength of the signals emerging from said intermediate frequency amplifier, audio amplifying and reproducing means connected to said amplitude modulation detecting means, an amplitude modulation audio broadcast tuner including frequency conversion means resonantly connected to the input of said intermediate frequency amplifiers, and switch means for selectively placing in operation said television tuner or said amplitude modulation audio broadcast tuner.

References Cited in the file of this patent

UNITED STATES PATENTS

| Number | Name | Date |
|---|---|---|
| 2,051,966 | Runge | Aug. 25, 1936 |
| 2,056,607 | Holmes | Oct. 6, 1936 |
| 2,186,455 | Goldmark | Jan. 9, 1940 |
| 2,218,501 | Andrews | Oct. 22, 1940 |
| 2,270,652 | Espley | Jan. 20, 1942 |
| 2,282,971 | Koch | May 12, 1942 |
| 2,393,971 | Busingnies | Feb. 5, 1946 |
| 2,429,762 | Koch | Oct. 28, 1947 |
| 2,474,978 | Holland | July 7, 1949 |
| 2,614,212 | Loughlin | Oct. 14, 1952 |
| 2,617,878 | Goldfus | Nov. 11, 1952 |

FOREIGN PATENTS

| Number | Country | Date |
|---|---|---|
| 525,826 | Great Britain | Sept. 5, 1940 |